United States Patent
Handke et al.

(10) Patent No.: US 7,364,177 B2
(45) Date of Patent: Apr. 29, 2008

(54) SUSPENSION STRUT TOP MOUNT

(75) Inventors: Günther Handke, Euerbach (DE); Markus Schulz, Remscheid (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 278 days.

(21) Appl. No.: 11/119,284

(22) Filed: Apr. 29, 2005

(65) Prior Publication Data

US 2005/0242542 A1 Nov. 3, 2005

(30) Foreign Application Priority Data

Apr. 30, 2004 (DE) .................... 10 2004 021 497

(51) Int. Cl.
*B60G 15/00* (2006.01)
(52) U.S. Cl. .................... 280/124.147; 280/124.155
(58) Field of Classification Search ......... 280/124.147, 280/124, 146, 124.154, 124.155
See application file for complete search history.

(56) References Cited

U.S. PATENT DOCUMENTS

| | | | |
|---|---|---|---|
| 4,260,177 | A | 4/1981 | Pflughaupt et al. |
| 4,618,127 | A | 10/1986 | Le Salver et al. |
| 4,804,169 | A | 2/1989 | Hassan |
| 5,487,535 | A | 1/1996 | Carter et al. |
| 6,296,396 | B1 | 10/2001 | Schwarzbich |
| 6,948,728 | B2 | 9/2005 | Pflügner et al. |
| 2003/0006574 | A1 | 1/2003 | Momose et al. |
| 2003/0025257 | A1 | 2/2003 | Handke |
| 2003/0047897 | A1 | 3/2003 | Hurrlein et al. |
| 2005/0063630 | A1 | 3/2005 | Handke |

FOREIGN PATENT DOCUMENTS

| | | |
|---|---|---|
| DE | 83 11 927 | 9/1983 |
| DE | 83 11 927 U1 | 9/1983 |
| DE | 195 45 170 | 6/1997 |
| DE | 199 60 699 | 6/2001 |
| DE | 100 47 773 | 4/2002 |
| EP | 0 126 006 | 11/1984 |
| EP | 0 133 743 | 3/1985 |
| EP | 1 000 781 | 5/2000 |

(Continued)

OTHER PUBLICATIONS

European Search Report dated Aug. 24, 2005, issued for EP Application No. 05 00 8446.

(Continued)

*Primary Examiner*—Eric Culbreth
(74) *Attorney, Agent, or Firm*—Cohen Pontani Lieberman & Pavane LLP

(57) ABSTRACT

A suspension strut top mount having a bearing connection onto a vehicle body and a spring retainer for a vehicle support. The spring retainer is set obliquely relative to a central axis of a suspension strut. The suspension strut top mount further has an obliquely set bearing arranged between the bearing connection and the spring retainer and has a bearing input part, which is associated with the bearing connection, and a bearing output part, which is associated with the spring retainer. A stop buffer, which is arranged concentrically to the central axis of the suspension strut, comes into contact on a cylinder-end surface of the suspension strut in a defined spring compression position. The stop buffer has an effective connection to the bearing output part of the bearing.

18 Claims, 1 Drawing Sheet

FOREIGN PATENT DOCUMENTS

| | | |
|---|---|---|
| FR | 2 828 255 | 2/2003 |
| FR | 2 829 430 | 3/2003 |
| FR | 2 859 513 | 3/2005 |
| FR | 2 863 944 | 6/2005 |
| JP | 09 303474 | 11/1997 |

OTHER PUBLICATIONS

Office Action issued for the corresponding German Application No. 10 2004 021 497.2.

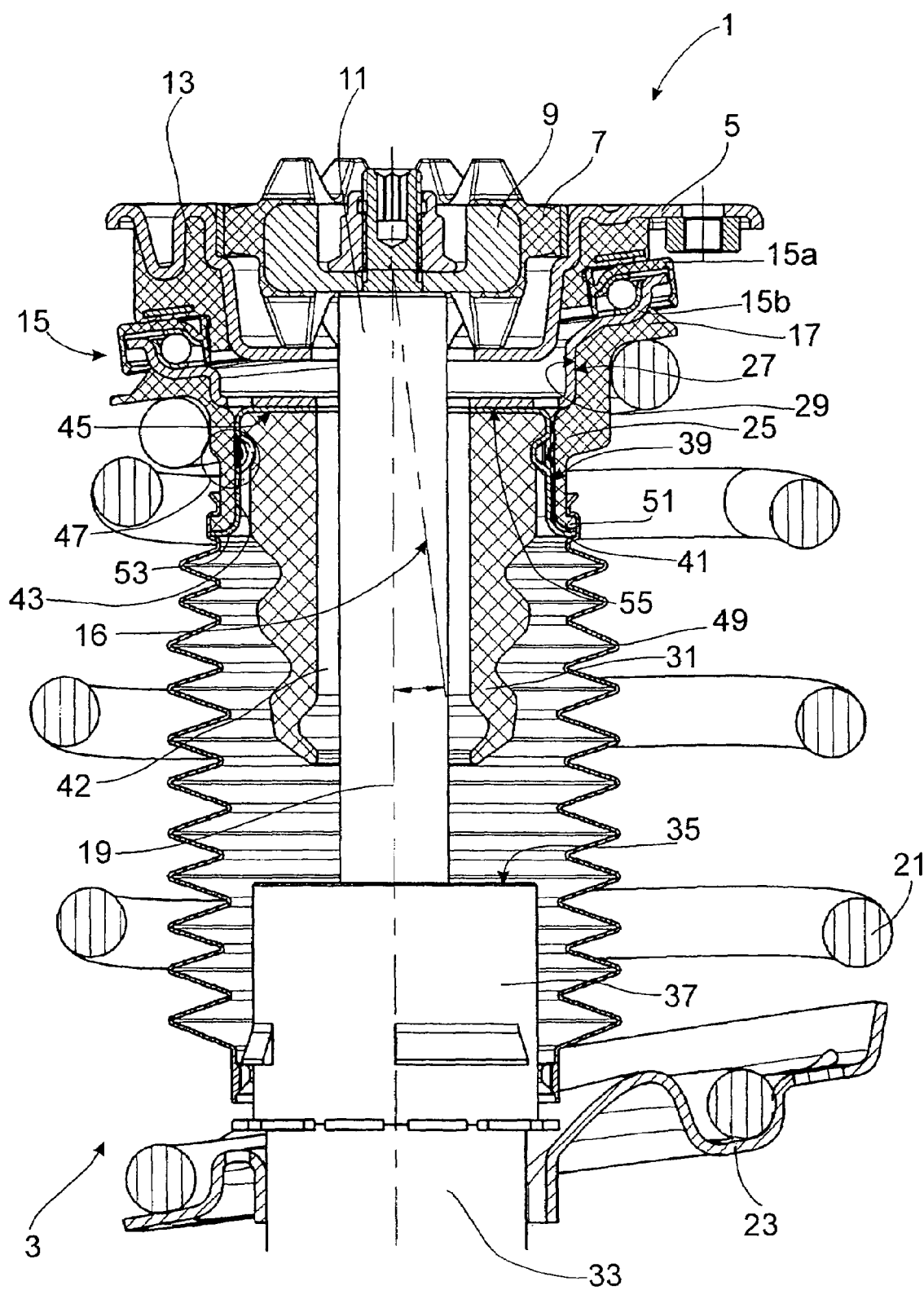

SUSPENSION STRUT TOP MOUNT

BACKGROUND OF THE INVENTION

1. Field of the Invention

The invention relates to a suspension strut top mount for use in a vehicle body.

2. Description of the Related Art

U.S. 2003/0006574 A1 discloses a suspension strut top mount for connection onto a vehicle body which has a bearing between a spring retainer and a bearing connection to the vehicle body. A second spring retainer is fastened at the cylinder end, the cylinder synchronously executing a pivoting motion during a steering motion of a vehicle wheel. The pivoting motion is transferred to the bearing-end spring retainer by a vehicle support spring, which is restrained between the two spring retainers. The bearing prevents restraint from occurring within the bearing, which reduces comfort, on the one hand, and has a negative effect on the life of the suspension strut top mount on the other.

The central axes of the bearing-end spring retainer and the bearing extend identically with the steering axis of the vehicle wheel. This measure is intended to prevent disturbing steering torques, which can cause an out-of-track motion of the vehicle.

The suspension strut top mount forming the generic type also has a stop buffer which, relative to the force path within the suspension strut top mount, is axially supported parallel to the bearing. In the case of superimposed spring compression and steering motions, a condition can occur where the stop buffer lands on a cylinder-end surface of the suspension strut and blocks the pivoting motion capability of the bearing on the spring retainer.

So that this problem does not occur, DE 83 11 927 U1 discloses that the stop buffer can execute a twisting motion relative to the cylinder by means of a second bearing. Such a second bearing, however, represents substantial cost and installation space expenditure.

SUMMARY OF THE INVENTION

The object of the present invention is to realize a vibration damper which, in the case of an obliquely set bearing within a suspension strut top mount, solves the blocking problem, in association with a stop buffer, known from the prior art.

According to the invention, the object is achieved by the stop buffer's having an effective connection to the bearing output part of the bearing.

The major advantage of the invention consists in the fact that the stop buffer can execute a relative motion in the peripheral direction with respect to the suspension strut without a blockage and restraint situation occurring within the suspension strut top mount. The technical requirement is also very simple because, with only one bearing, the complete suspension strut top mount, including the spring retainer, is rotationally decoupled from the cylinder of the suspension strut.

In a further advantageous embodiment, the central axis of the obliquely set bearing and a steering axis of the suspension strut are aligned so as to be at least approximately coincident. Comprehensive tests have shown that, despite the angular setting between the stop buffer and the steering axis, about which the suspension strut pivots during a steering motion, no clamping forces or friction forces occur between the stop buffer and a piston rod of the suspension strut.

Provision is made for the spring retainer to have an outer surface on which the stop buffer is radially supported. For this purpose, the spring retainer has a sleeve section, which extends concentrically with the central axis of the suspension strut.

In addition, the spring retainer has a retention surface for a tubular protective element enveloping the stop buffer. As a consequence, no torsional loads occur within the protective element either so that the protective element can be connected at one end to the cylinder of the suspension strut.

The bearing output part has a support surface for the axial support of the stop buffer. To avoid transverse forces, the support surface is aligned at right angles to a central axis of the suspension strut.

With a view to a simple assembly procedure, the spring retainer and the bearing output part form a press connection by means of axially extending clamping surfaces. The spring retainer and the bearing output part can form a structural unit which can be pre-assembled. The structural unit can be produced independently of a specified cycle time within an assembly procedure of the overall suspension strut.

The spring retainer should preferably consist of a plastic. So that, nevertheless, even very large forces can be transferred to the bearing output part, a reinforcement sleeve for the spring retainer is arranged between the stop buffer and the spring retainer.

The reinforcement sleeve has an annular end, which is supported on the bearing output part. This measure additionally stiffens the reinforcement sleeve and offers the possibility of employing a relatively thin-walled bearing output part.

To axially secure the stop buffer to the suspension strut top mount, a snap connection is present between the reinforcement sleeve and the stop buffer.

The reinforcement sleeve has at least angled edge sections, possibly also a completely circumferential edge, which are axially supported on the spring retainer.

The at least angled edge sections of the reinforcement sleeve provide a further retention surface for the tubular protective element. As a consequence, two alternately effective retention surfaces are present for the tubular protective element, so that a clearance-free fastening is possible between the protective element and the suspension strut top mount.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE is an axial section view of an exemplary suspension strut according to the invention.

DETAILED DESCRIPTION OF THE PRESENTLY PREFERRED EMBODIMENTS

The FIGURE shows a suspension strut top mount 1 for a suspension strut 3, of which only an upper partial region is shown. The suspension strut top mount has a bearing connection 5 to a vehicle body, which is not shown. By means of its cup-shaped three-dimensional shape, the bearing connection 5 accommodates an elastomer body 7, which at least partially encloses a connecting ring 9 on the outside, the connecting ring having an axial and torsion-proof connection to a piston rod 11 of the suspension strut.

On the outside, the bearing connection has a further elastomer body 13, on which a bearing 15 is supported axially and radially. The bearing 15 is aligned obliquely with its central axis at least approximately coincident with a steering axis 16. Compensation for centrifugal forces has to be achieved by the obliquely set bearing 15 without the bearing itself being critically loaded. The steering axis 16 encloses an angle α with a central axis 19 of the suspension strut 3. The bearing 15 comprises a bearing input part 15a and a bearing output part 15b, which parts can execute a rotational motion relative to one another. For the invention, it is unimportant whether a rolling contact bearing or a sliding bearing is used. A spring retainer 17 for a vehicle support spring 21, which is in contact at its other end with a cylinder-end spring retainer 23, is supported on the bearing output part 15b. The central axis of the vehicle support spring is also at least approximately aligned identically to the steering axis 16. The spring retainer 17, which is preferably manufactured from a plastic, has a sleeve section 25 so that, between the spring retainer 17 and an offset region of the bearing output part 15b, clamping surfaces 27, 29, provide a press-fit between the bearing output part 15b and the spring retainer 17.

A stop buffer 31 is arranged concentrically with the central axis 19 of the suspension strut 3, which stop buffer 31 comes into contact, from a defined spring compression position of the piston rod 11 in a cylinder 33, with a cylinder-end surface 35 of the suspension strut which, in this case, is formed by an additional cap 37. The stop buffer 31 has effective connection with the bearing output part 15b of the bearing 15, so that these two parts move synchronously, axially and in the peripheral direction.

The spring retainer 17, in particular the sleeve section 25, has a radially inner surface 39 by which the stop buffer 31 is radially supported. A support surface 55 of the bearing output part 15b, which support surface 55 is aligned at right angles to the central axis 19 of the suspension strut, provides axial support for the stop buffer. The internal diameter of the stop buffer 31 and the piston rod 11 form a free annular space 42 in order to avoid a rubbing contact between the piston rod 11 and the stop buffer 31.

A reinforcement sleeve 43 is arranged between the stop buffer 31 and the spring retainer 17. This reinforcement sleeve has an annular end, 45, which is axially supported on the bearing output part 15b. The reinforcement sleeve 43 and the stop buffer 31 form a snap connection 47 which, for example, contains radially inwardly directed beads of the reinforcement sleeve 43, which beads engage in a groove of the stop buffer.

The piston rod 11 and the stop buffer 31 are enveloped by a tubular protective element 49, in this exemplary embodiment an axially elastic bellows, the protective element 49 being axially supported at one end on a retention surface 51 of the spring retainer 17. The reinforcement sleeve 43 has at least angled edge sections 53, possibly a completely circumferential edge, which edge is supported at the end on the spring retainer 17, this edge providing a further retention surface 41 for the tubular protective element 49.

During straight-line travel and a small to average spring compression movement of the piston rod 11 toward the cylinder 33 of the suspension strut, there is neither a bearing motion nor a contact of the stop buffer 31 with the cylinder-end surface 35.

A steering motion, even in association with a spring-compression motion of a wheel, which is not shown, about the steering axis 16 leads to a twisting motion within the bearing 15 and, as a consequence, to a wobbling motion of the stop buffer relative to a hypothetical vertical reference line, for example the central axis 19. At the same time, however, the suspension strut 3 also moves three-dimensionally about the steering axis 16, so that the annular space 42 prevents a rubbing contact between the stop buffer 31 and the piston rod 11 despite the relative motion of the stop buffer 31 relative to the piston rod 11.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suspension strut top mount for installation between a vehicle body and a strut assembly having a cylinder with a central axis and an end surface, the mount comprising:
   a bearing connection which can be fixed to the vehicle body;
   a spring retainer for a vehicle support spring;
   a bearing mounted obliquely with respect to the central axis between the bearing connection and the spring retainer, the bearing having a bearing input part associated with the bearing connection and a bearing output part associated with the spring retainer;
   a stop buffer connected to the bearing output part, the stop buffer being arranged concentrically with respect to the central axis and coming into contact with the end surface of the cylinder at a pre-determined compression of the vehicle support spring; and
   a reinforcement sleeve for the spring retainer arranged between the spring retainer and the stop buffer, the reinforcement sleeve having an annular end which is supported against the bearing output part.

2. The suspension strut top mount of claim 1, wherein the strut assembly has a steering axis extending transversely to the central axis, the bearing being centered about a bearing axis substantially aligned with the steering axis.

3. The suspension strut top mount of claim 1, wherein the bearing output part has a radially extending support surface axially supporting the stop buffer.

4. The suspension strut top mount of claim 3, wherein the support surface extends perpendicular to the central axis.

5. The suspension strut top mount of claim 1, wherein the spring retainer and the bearing output part have axially concentric clamping surfaces pressing against one another so as to couple the spring retainer and the bearing output part to one another.

6. The suspension strut top mount of claim 1 further comprising a snap connection between the reinforcement sleeve and the stop buffer.

7. The suspension strut top mount of claim 1, wherein the reinforcement sleeve has an angled edge section extending radially outwards from the stop buffer and axially supported on the spring retainer.

8. The suspension strut top mount of claim 7, wherein the angled edge section comprises a circumferentially continuous angled section.

9. A suspension strut top mount for installation between a vehicle body and a strut assembly having a cylinder with a central axis and an end surface, the mount comprising:
- a bearing connection which can be fixed to the vehicle body;
- a spring retainer for a vehicle support spring, the spring retainer having a sleeve section with a radially inner surface and a retention surface for a tubular protective element surrounding a stop buffer;
- a bearing mounted obliquely with respect to the central axis between the bearing connection and the spring retainer, the bearing having a bearing input part associated with the bearing connection and a bearing output part associated with the spring retainer; and
- the stop buffer connected to the bearing output part and supported by the radially inner surface of the spring retainer, the stop buffer being arranged concentrically with respect to the central axis and coming into contact with the end surface of the cylinder at a pre-determined compression of the vehicle support spring.

10. The suspension strut top mount of claim 9, wherein the strut assembly has a steering axis extending transversely to the central axis, the bearing being centered about a bearing axis substantially aligned with the steering axis.

11. The suspension strut top mount of claim 9, wherein the bearing output part has a radially extending support surface axially supporting the stop buffer.

12. The suspension strut top mount of claim 11, wherein the support surface extends perpendicular to the axis of the strut assembly.

13. The suspension strut top mount of claim 9, wherein the spring retainer and the bearing output part of the bearing have concentric clamping surfaces pressing against one another so as to couple the spring retainer and the bearing output part to one another.

14. The suspension strut top mount of claim 9 further comprising a reinforcement sleeve for the spring retainer arranged between the spring retainer and the stop buffer.

15. The suspension strut top mount of claim 14 wherein the reinforcement sleeve has an annular end which is supported against the bearing output part.

16. The suspension strut top mount of claim 14 further comprising a snap connection between the reinforcement sleeve and the stop buffer.

17. The suspension strut top mount of claim 14, wherein the reinforcement sleeve has an angled edge section extending radially outwards from the stop buffer and axially supported on the spring retainer, the angled edge section providing an additional retention surface for the tubular protective element.

18. The suspension strut top mount of claim 17, wherein the angled edge section comprises a circumferentially continuous angled section.

* * * * *

UNITED STATES PATENT AND TRADEMARK OFFICE
CERTIFICATE OF CORRECTION

PATENT NO. : 7,364,177 B2  
APPLICATION NO. : 11/119284  
DATED : April 29, 2008  
INVENTOR(S) : Günther Handke Page 1 of 1

It is certified that error appears in the above-identified patent and that said Letters Patent is hereby corrected as shown below:

On the Title page, item [73] should read:

(73) Assignee:    ZF Friedrichshafen AG  
Friedrichshafen, Germany

Volkswagen AG  
Wolfsburg, Germany

Signed and Sealed this

Twenty-fifth Day of November, 2008

JON W. DUDAS  
*Director of the United States Patent and Trademark Office*